Patented Oct. 4, 1938

2,131,806

UNITED STATES PATENT OFFICE 2,131,806

TREATMENT OF HYDROCARBONS

Vladimir Ipatieff and Vasili Komarewsky, Chicago, Ill., assignors to Universal Oil Products Company, Chicago, Ill., a corporation of Delaware No Drawing. Application August 16, 1935,
Serial No. 36,561

4 Claims. (Cl. 260—676)

The invention relates to the treatment of olefinic hydrocarbons to produce therefrom saturated hydrocarbons of higher molecular weight, and in a more specific sense, is concerned with treatment of such hydrocarbons by concurrent polymerization and hydrogenation thereof.

The class of olefinic hydrocarbons with which the present invention is concerned is the most reactive of the various hydrocarbon groups, owing to the presence of double bonds between carbon atoms. By virtue of this so-called unsaturation, these hydrocarbons are more or less readily oxidized, hydrogenated and polymerized and they unite directly with practically all inorganic acids and a great many organic acids to form addition compounds, which furnish intermediates from which useful derivatives can be manufactured. Thus, any of the olefinic hydrocarbons can serve as a source of an alcohol with a corresponding number of carbon atoms by first making the sulphate and then hydrolyzing this compound. This reaction is utilized in the manufacture of ethyl alcohol from ethylene and in the manufacture of iso-propyl alcohol from the propylene present in cracked gas mixtures.

The olefins are of concern to the petroleum refining industry for several reasons. Those that are liquid at ordinary temperatures and pressures constitute a variable proportion of the cracked gasolines of commerce and contribute largely to its superior anti-knock value in comparison with straight run distillates of similar boiling range. Those olefins in such cracked gasolines which are of the conjugated character, however, are sufficiently reactive with traces of oxygen, particularly while under the influence of light, to form first compounds of a peroxidic character, which evidently instigate a series of chain reactions leading ultimately to the formation of gummy and resinous compounds which may in turn cause a haze or color in the gasolines on storage and leave sufficient residue on evaporation to effect the normal operation of feed lines and carburetors in internal combustion engines. The principal object of the treatments commonly applied to cracked distillates of gasoline boiling point range is the removal of these more readily activated compounds while leaving behind the more stable mono-olefins.

Fixed gases produced incidental to oil cracking operations are also relatively high in olefin content, though the total concentration of olefins and the distribution of the different compounds vary widely in the gases from different cracking processes. In the gases from high temperature vapor phase and more or less intensive operations which may produce fairly high yields of high antiknock materials, there will be relatively more ethylene than its higher homologs in the gases, while in liquid-vapor phase operations, which aim at a balance between yield and quality of product on an economy basis, there will be relatively higher percentages of propylene, the butylenes and the higher molecular weight homologs. This last named group, which is usually designated as the "higher olefins" in cracking plant gases is the one which is most readily polymerized by catalysts under moderate conditions of temperature and pressure to form liquids boiling within the approximate range of gasoline.

The present process is not limited solely to the treatment of such gas mixtures but may be employed for the treatment of olefins which are normally liquid. For purposes of reference as indicating the character of the compounds treated, the following table is introduced, which shows the names, formulas, and common characteristics of some of the lower molecular weight mono-olefins:

Olefin hydrocarbons

| Compound | Formula | Boiling point °C. |
|---|---|---|
| Ethylene | $CH_2=CH_2$ | $-105°$ |
| Propylene | $CH_3CH=CH_2$ | $-48°$ gaseous |
| Ethyl ethylene | $CH_3CH_2CH=CH_2$ | $-5°$ |
| Plane-sym.}dimethyl ethyl- Axial-sym.} ene (butenes). | $CH_3.CH=CH.CH_3$ | $+1°$ / $2.5°$ |
| Unsym. dimethyl ethylene (iso-butylene). | $(CH_3)_2C=CH_2$ | $-6°$ |
| n-Propyl ethylene, $\alpha$-amylene. | $CH_3CH_2CH_2CH=CH_2$ | $+39°$ |
| Isopropyl ethylene, $\alpha$-isoamylene. | $(CH_3)_2CH.CH=CH_2$ | $+21°$ |
| Sym. methylethylethylene, $\beta$-amylene. | $CH_3.CH_2.CH=CH.CH_3$ | $+36°$ |
| Unsym. methyl ethylethylene, $\gamma$-amylene. | $CH_3.CH_2$ $\diagdown$ $C=CH_2$ $\diagup$ $CH_3$ | $+31°$ |
| Trimethyl ethylene, $\beta$-isoamylene. | $(CH_3)_2C=CH.CH_3$ | $+36°$ |
| Tetramethyl ethylene. | $(CH_3)_2C=C(CH_3)_2$ | $+73°$ |

The hydrogenation of olefins is a relatively simple process requiring only moderately active catalysts, temperatures of the order of 300 to 500° F. and atmospheric or only slightly superatmospheric pressures. Thus, ethylene is readily hydrogenated by passing it in a mixture with a moderate excess of hydrogen or even a hydrogen containing gas such as water gas over reduced iron or nickel. When dealing with liquid olefins such as, for example, hexylene, which occurs to a considerable percent in cracked gasoline mixtures, hydrogenation is readily effected by heating the liquid under pressure in the presence of small quantities of reduced nickel or nickel oxide, while introducing gaseous hydrogen.

The foregoing brief résumé of the reactions of olefinic hydrocarbons from the standpoint of the present process indicates that, in general, the reactions of polymerization and hydrogenation are opposite in character, and it was, therefore, not to be expected on a basis of known chemical laws that the two could be made to proceed concurrently with the production of molecules corresponding to multiples of the olefin hydrocarbons but of a paraffinic character. This result was still less to be expected from a consideration of the character of the catalysts used respectively in polymerization and hydrogenation reactions. Catalysts effective in polymerizing olefins comprise metal halides, such as for example, aluminum chloride, zinc chloride, magnesium chloride, etc., and also sulphuric acid, phosphoric acid, perchloric acid, boron fluoride, etc. Many of these compounds have been found to exert a poisoning influence when present even in small traces in ordinary hydrogenation reactions.

The most effective hydrogenation catalysts, when considering the incidental poisoning influences to which they may be subjected are the oxides and sulfides of the metals in the left hand column of the 6th group of the periodic table, to wit, chromium, molybdenum and tungsten, and the corresponding compounds of the iron group comprising iron, nickel and cobalt. These catalysts are suggested as being the most efficient for general purposes but is not intended to infer that the compound catalyst mixtures utilizable in the present instance are limited to the specific compounds enumerated. For example, it is well known that, in the absence of sulphur, arsenic and other poisoning influences, reduced nickel is a very effective hydrogenation catalyst and that the platinum group comprising platinum, iridium and osmium are energetic catalyzers and utilizable when their cost or availability permits. It is within the concepts of the present invention to employ any catalyst or catalyst mixture to effect the reactions of hydrogenation which may have been found suitable for use in processes involving substantially only hydrogenation reactions.

In one specific embodiment the present invention comprises the manufacture of paraffin hydrocarbons from olefin hydrocarbons by concurrently catalyzed polymerization and hydrogenation reactions.

From a consideration of the numerous olefin hydrocarbons, which include both mono-olefins, di-olefins and still more highly unsaturated compounds, and also the large number of possible polymerizing as well as hydrogenating catalysts, it is evident that a large number of combinations of different hydrocarbons with the different members of the two groups of the catalysts exist to give the present invention a broad scope on a basis of the number of specific reactions which it may bring about. The scope is further widened in that groups or mixtures of olefins may be treated and that catalyst combinations may be employed which are found by trial to be most useful in promoting a given reaction.

Each catalyst combination comprising a polymerizing and a hydrogenating catalyst respectively will exert its own peculiar accelerating action upon the reactions of polymerization and hydrogenation and consequently will specifically influence the character of the resultant products. Considering the matter in this light will make it evident to those familiar with the empirical state of the catalyst art that the various combinations of catalytic materials which the process may employ will not necessarily produce identically equivalent results either in degree or in kind.

The details of procedure in carrying out the invention will necessarily need to be adapted to the reactivity and phase of the olefin or olefins undergoing treatment, the relative degrees of polymerization and hydrogenation required, and the character and effectiveness of the catalytic materials chosen to accelerate the reactions of polymerization and hydrogenation respectively. A few cases may be chosen which are illustrative of different procedures and the necessary modifications to take care of cases not covered by the examples will then be more or less obvious to those sufficiently familiar with commercial chemical operations.

A case may be assumed in which the olefin to be treated is normally gaseous and both catalysts are solids. This condition is represented by ethylene as the olefin, aluminum chloride as the polymerizing catalyst, and nickel as the hydrogenating catalyst. In operating with these materials according to batch procedure, the two catalysts may be placed in a rotatable pressure bomb and a mixture of ethylene and hydrogen pumped in until a given pressure is reached, after which the bomb is heated and rotated until the reactions have taken place with the formation of such compounds as butanes, hexanes, octanes, etc. The step of introducing the mixture of ethylene and hydrogen may be repeated intermittently after the pressure has ceased to drop under the given temperature conditions and may be repeated until the catalysts indicated have lost their activity or the presence of too great quantities of accumulated liquids renders their removal imperative. The reaction between ethylene and hydrogen may be brought about in a continuous manner by passing the gas mixture under pressure and at a suitably elevated temperature over a solid composite mass comprising nickel or other hydrogenating catalyst while injecting controlled quantities of aluminum chloride.

When operating with an olefin which is normally liquid, such as for example amylene, this material is charged to a pressure apparatus in contact with the polymerizing and hydrogenating catalyst and reaction is induced by heating to a suitable temperature and simultaneously introducing hydrogen under pressure, preferably through a perforated distributing device which maintains the catalysts in suspension and causes sufficient intimacy of contact to insure the completion of the desired reactions with a minimum flow of hydrogen. The steps of removing the hydrogenated polymers intermittently will be followed in this case as before in the preceding example.

The relative degree of polymerization and hydrogenation may be more or less separately controlled by varying the quantity of different polymerizing catalysts of varying activity among themselves while at the same time varying the hydrogenation catalysts, the amount of hydrogen and the conditions of hydrogenation in respect to temperature and pressure. Thus, taking ethylene as an example again, its reactions may be varied between two extremes of complete polymerization without hydrogenation and complete hydrogenation of polymers. The ultimate polymerization of this gas and generally of other olefins leads to the production of high molecular weight compounds of a viscous character which are particularly suitable as lubricants since they have in addition to a high viscosity and low sludging characteristics, a viscosity index usually equal to or better than the standards from paraffin crudes. The end product of hydrogenation of ethylene is, of course, ethane.

The present process is particularly well adapted to the production of iso-paraffins boiling within the range of commercial motor fuel from the mono-olefins normally present in the cracked gas mixtures produced incidental to oil cracking operations. The mechanism of the joint reactions is apparently such that there is a decided preponderance of iso-paraffins in these liquid products which hydrocarbons are known to be of considerably higher antiknock value than their normal counterparts. Thus, for example, from the olefins in the stabilizer reflux of plants operating in conjunction with cracking plants and comprising percentages of propylene and butylenes of the order of 30 to 50%, high yields of iso-hexanes, heptanes and octanes are produced which have great value as blending components in gasoline mixtures. Such compounds have complete stability under ordinary conditions of storage and water white color and require no other treatment than a light caustic wash to render them fit for blending purposes.

The temperatures necessary for effecting the present type of concurrent polymerization and hydrogenation reactions do not as a rule exceed 300° C., and the pressure of hydrogen under the operating conditions is practically always below 100 atmospheres. The exact conditions of temperature and pressure, rate of flow in continuous operations, etc., will in a majority of instances be determined best by small scale operations before transferring the process to commercial setups.

The following examples are given to illustrate the general character of the results obtainable by the use of the process, although not with the intent of unduly restricting its scope as an invention.

Example 1

100 parts of iso-butylene was heated in a closed pressure vessel in the presence of 2.5 parts by weight of nickel oxide and a corresponding weight of zinc chloride for 12 hours at a temperature of 275° C. and a maximum pressure of 100 atmospheres of hydrogen. Fractionation of the products of reaction shows a yield of 35% of pure iso-octane (2,2,4-trimethylpentane).

Example 2

Iso-butylene was treated again under the conditions of Example 1, utilizing the same weight of aluminum chloride in place of the zinc chloride. In this case the boiling range of the liquid products was somewhat higher, 50% of the products being iso-paraffins boiling at temperatures from 130 to 325° C.

Example 3

A run was made on iso-butylene using as a polymerizing catalyst a solid composite comprising a siliceous carrier and phosphoric acid, and as the hydrogenating catalyst nickel oxide. The proportions, temperatures, pressure and time were the same as in Example 1. In this case, however, a yield of 50% by weight of iso-octane was obtained.

The solid phosphoric acid catalyst composite used in this example was manufactured by adding 70 parts by weight of pyro-phosphoric acid to 30 parts by weight of kieselguhr at a temperature of 150° C., mixing to a uniform pasty consistency and calcining for 20 hours at 275° C. The solid cake thus produced was ground and sized out of contact with moist air and particles were saved which were smaller than 4 mesh and larger than 10 mesh.

The novel and useful character of the invention is evident from the descriptive matter of the preceding specification and the numerical data submitted, although neither section is intended to unduly limit the invention's generally broad scope.

We claim as our invention:

1. A process for producing hyrocarbon liquid boiling within the motor fuel range and containing iso-paraffins, which comprises subjecting olefinic gas to concurrent polymerization and hydrogenation by treatment thereof with hydrogen in the presence of a solid composite of a siliceous carrier, phosphoric acid and a hydrogenating catalyst.

2. A process for producing hydrocarbon liquid boiling within the motor fuel range and containing iso-paraffins, which comprises subjecting olefinic gas to concurrent polymerization and hydrogenation by treatment thereof with hydrogen in the presence of a solid composite of a siliceous carrier, phosphoric acid and nickel oxide.

3. A process for producing iso-octane from butylene which comprises subjecting the butylene to concurrent polymerization and hydrogenation by treatment thereof with hydrogen in the presence of a solid composite of a siliceous carrier, phosphoric acid and a hydrogenating catalyst.

4. A process for producing iso-octane from butylene which comprises subjecting the butylene to concurrent polymerization and hydrogenation by treatment thereof with hydrogen in the presence of a solid composite of a siliceous carrier, phosphoric acid and nickel oxide.

VLADIMIR IPATIEFF.
VASILI KOMAREWSKY.